(12) United States Patent
Cho (10) Patent No.: US 8,050,659 B2
(45) Date of Patent: Nov. 1, 2011

(54) MOBILE TERMINAL AND PROTECTION METHOD USING MULTIPLE PIECES OF AUTHENTICATION INFORMATION

(75) Inventor: Sung Dae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 12/229,831

(22) Filed: Aug. 27, 2008

(65) Prior Publication Data
US 2009/0124236 A1   May 14, 2009

(30) Foreign Application Priority Data
Nov. 12, 2007   (KR) .................. 10-2007-0114705

(51) Int. Cl.
  *H04M 1/66*   (2006.01)
(52) U.S. Cl. ........ 455/411; 455/410; 455/558; 455/433; 455/435.1; 455/422.1
(58) Field of Classification Search .................. 455/410, 455/411, 558, 433, 453.1, 403, 422.1, 43.1, 455/422.15
See application file for complete search history.

(56) References Cited

U.S. PATENT DOCUMENTS

| | | | |
|---|---|---|---|
| 2004/0017913 A1* | 1/2004 | Hawkes et al. | 380/37 |
| 2005/0197102 A1* | 9/2005 | Kim | 455/410 |
| 2007/0123305 A1* | 5/2007 | Chen et al. | 455/558 |

* cited by examiner

*Primary Examiner* — Nick Corsaro
*Assistant Examiner* — Chuong A Ngo (57) ABSTRACT

A mobile terminal and protection method for the same are disclosed. The mobile terminal includes: a wireless communication unit receiving first authentication information and identification information during an initial setting mode; a memory unit, having at least two authentication regions to register the received first authentication information and second authentication information derived from the first authentication information, and registering the received identification information; a comparator comparing, upon power on, the first and second authentication information to each other; and a control unit controlling an operation to perform communication using the identification information when the first and second authentication information match, and to set a lock function when the first and second authentication information do not match. Thus, when the mobile terminal is stolen, new identification information is not registered and existing identification information is not changed, contributing to solving the problem of lost or stolen mobile terminals.

15 Claims, 5 Drawing Sheets

MOBILE TERMINAL AND PROTECTION METHOD USING MULTIPLE PIECES OF AUTHENTICATION INFORMATION

CROSS-REFERENCE TO RELATED APPLICATION(S) AND CLAIM OF PRIORITY

The present application claims priority to an application entitled "MOBILE TERMINAL AND PROTECTION METHOD FOR THE SAME" filed in the Korean Intellectual Property Office on Nov. 12, 2007 and assigned Serial No. 2007-0114705, the contents of which are incorporated herein by reference.

TECHNICAL FIELD OF THE INVENTION

The present invention relates generally to a mobile terminal and, more particularly, to a mobile terminal storing at least two pieces of authentication information for protection and to a protection method for the same.

BACKGROUND OF THE INVENTION

Advanced mobile terminals perform composite or diversified functions. With diversified multimedia functions, mobile terminals have become convergence terminals. Such a mobile terminal has unique identification information to receive communication services. During an initial setting mode, a mobile terminal registers authentication information, and then registers identification information on the basis of the registered authentication information.

However, a high-end mobile terminal with diversified functions may become a target of theft. In a stolen or lost mobile terminal, pre-registered authentication information and identification information are erased through initialization, and new authentication information and identification information are registered through an initial setting mode. Hence, a stolen mobile terminal prevented from receiving communication services using newly registered identification information.

SUMMARY OF THE INVENTION

To address the above-discussed deficiencies of the prior art, it is a primary object to provide a mobile terminal and protection method for the same that prevent illegal use of the mobile terminal upon theft or loss.

In accordance with an exemplary embodiment of the present invention, there is provided a protection method for a mobile terminal, including: registering, during an initial setting mode, at least two pieces of authentication information in different regions of a memory of the mobile device; registering identification information using one of the pieces of authentication information; comparing, upon powering on of the mobile terminal, the pieces of authentication information to each other; and performing, when the pieces of authentication information match, a communication operation using the identification information, and setting, when the pieces of authentication information do not match, a lock function.

In accordance with another exemplary embodiment of the present invention, there is provided a mobile terminal including: a wireless communication unit receiving a first authentication information and an identification information during an initial setting mode; a memory unit, having at least two authentication regions to register the received first authentication information and a second authentication information derived from the first authentication information, and registering the received identification information; a comparator comparing, upon powering on of the mobile terminal, the first and the second authentication information to each other; and a control unit controlling an operation to perform communication using the identification information when the first and the second authentication information match, and to set a lock function when the first and the second authentication information do not match.

In a feature of the present invention, at least two pieces of authentication information are registered in a mobile terminal. Identification information can be registered or updated only when all of the pieces of authentication information match. Thus, even when the mobile terminal is stolen, new identification information is not readily registered in the mobile terminal and existing identification information is not readily changed. Further, upon power on, the mobile terminal compares the pieces of authentication information to each other, and activates a lock function if they do not match. Accordingly, upon theft or loss of the mobile terminal, illegal use thereof is prevented. Thereby, the present invention contributes to solving the problem of lost or stolen mobile terminals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the description, the terminology "identification information" refers to unique information necessary for a mobile terminal to perform communication. That is, mobile terminals are distinguished from each other through their identification information. Examples of identification information include electronic serial numbers (ESN) for CDMA terminals, and international mobile equipment identity (IMEI) numbers for GSM terminals. The terminology "authentication information" refers to information assuring the validity of registration and update of the identification information in the mobile terminal. Examples of authentication information include authentication addresses such as master subsidy lock (MSL) addresses or authentication codes such as MSL codes. An "identification information server" is a server that checks the validity of registration and update of identification information in a mobile terminal and provides identification information to the mobile terminal. The identification information server stores matched pairs of an authentication address and authentication code.

Figure 1:
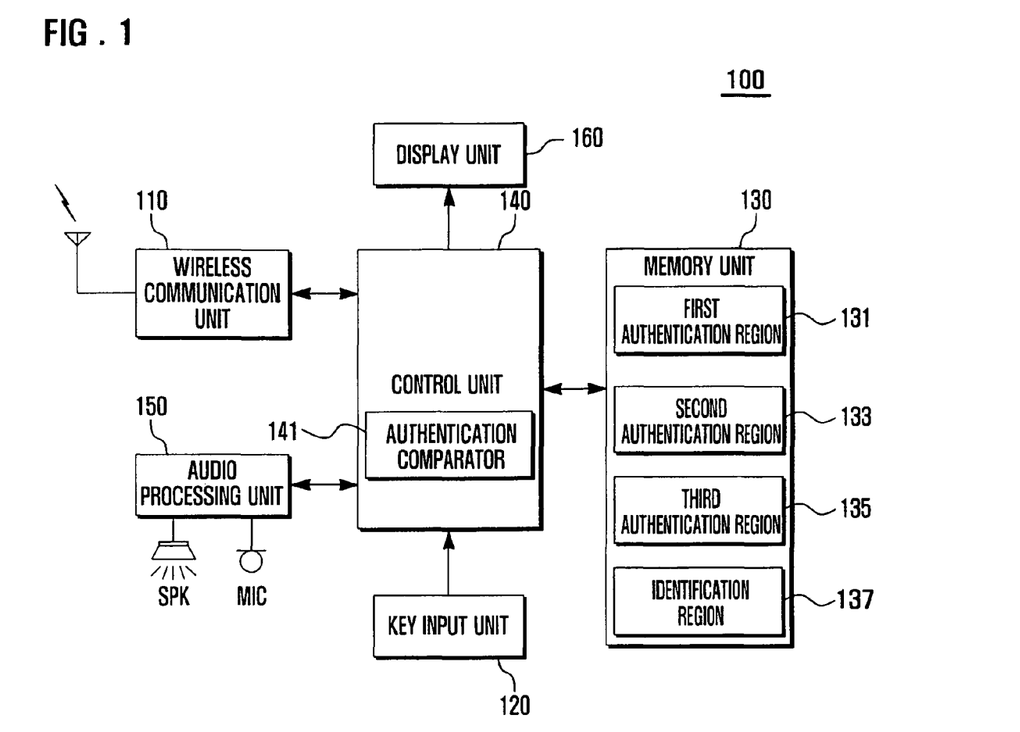
FIG. 1 is a block diagram illustrating a mobile terminal according to an exemplary embodiment of the present invention.

FIG. 1 is a block diagram illustrating a mobile terminal 100 having a protection capability according to an exemplary embodiment of the present invention. The mobile terminal 100 is assumed to be a mobile phone.

Referring to FIG. 1, the mobile terminal 100 includes a wireless communication unit 110, a key input unit 120, a memory unit 130, a control unit 140, an audio processing unit 150, and a display unit 160.

The wireless communication unit 110 performs wireless communication for the mobile terminal 100. The wireless communication unit 110 includes a radio frequency (RF) transmitter for upconverting the frequency of a signal to be transmitted and amplifying the signal, and an RF receiver for low-noise amplifying a received signal and downconverting the frequency of the received signal. The wireless communication unit 110 receives authentication information and identification information during the initial setting mode.

The key input unit 120 includes a plurality of alphanumeric and function keys for inputting alphanumeric information and for setting various functions. The key input unit 120 includes a short-cut key to power on and off the mobile terminal 100.

The memory unit 130 includes a program section and data section. The program section stores programs to control normal operation of the mobile terminal 100. In particular, the program section stores a program to control registration and update of identification information using at least two pieces of authentication information. The data section stores data generated from execution of the programs.

In particular, the memory unit 130 includes at least two regions to store a piece of authentication information received through the wireless communication unit 110 and at least one piece of authentication information derived from the received authentication information. The region storing the derived authentication information has to be nonvolatile. For example, the memory unit 130 includes a first authentication region 131 to store first authentication information received during the initial setting mode. The memory unit 130 also includes a second authentication region 133 to store second authentication information derived from the first authentication information with encryption. The memory unit 130 may further include a third authentication region 135 to store third authentication information derived from the first or second authentication information through checksumming. Here, the second authentication region 133 and third authentication region 135 are nonvolatile. In addition, the memory unit 130 includes an identification region 137 to store identification information received through the wireless communication unit 110.

The control unit 140 controls the overall operation of the mobile terminal 100. The control unit 140 may include a data processing module, which includes a transmitter for encoding and modulating a signal to be transmitted and a receiver for demodulating and decoding a received signal. Thereto, the data processing module may include a modulator/demodulator (modem) and a coder/decoder (codec). The codec includes a data codec for processing packet data, and an audio codec for processing an audio signal such as a voice signal. The control unit 140 includes an authentication comparator 141 to compare pieces of authentication information stored in the memory unit 130 to each other.

In particular, the control unit 140 controls registration of authentication information during the initial setting mode. That is, the control unit 140 derives at least one piece of authentication information from authentication information received through the wireless communication unit 110. The control unit 140 controls an operation to store the received authentication information and the derived authentication information at different authentication regions of the memory unit 130. In addition, the control unit 140 compares pieces of authentication information to each other. If all of the pieces of authentication information match, the control unit 140 controls an operation to register identification information using one of the pieces of authentication information. Further, upon power on, the control unit 140 compares pieces of authentication information stored in the memory unit 130 to each other. If all of the pieces of authentication information match, the control unit 140 can perform communication using stored identification information, and in particular change the stored identification information. If all of the pieces of authentication information do not match, the control unit 140 sets a lock function at the mobile terminal 100.

The audio processing unit 150 reproduces through a speaker SPK an incoming audio signal from the audio codec of the data processing module, and sends an outgoing audio signal from a microphone MIC to the audio codec of the data processing module.

The display unit 160 displays user data from the control unit 140. The display unit 160 may include a panel of liquid crystal display (LCD) devices, LCD controller for controlling LCD devices, and video memory for storing visual data. If the panel has a touch screen capability, the display unit 160 can also act as an input device.

Figure 2:
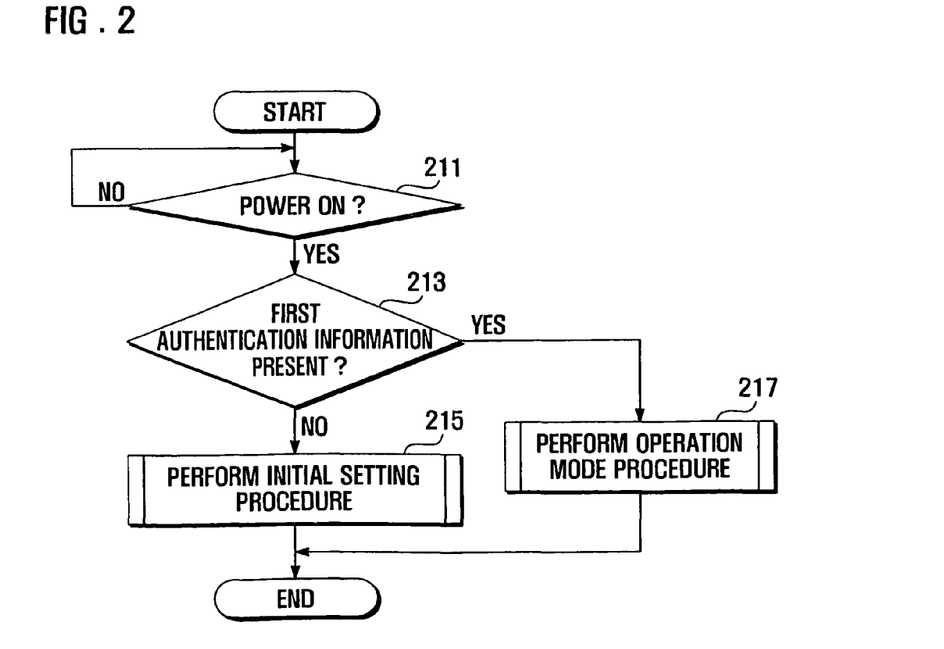
FIG. 2 is a flow chart illustrating a protection method for a mobile terminal according to another exemplary embodiment of the present invention.

FIG. 2 is a flow chart illustrating a protection method for the mobile terminal 100 according to another exemplary embodiment of the present invention. The mobile terminal 100 is assumed to have three authentication regions 131, 133 and 135 in the memory unit 130.

Referring to FIG. 2, when the power is turned on (S211), the control unit 140 of the mobile terminal 100 checks for the presence of the first authentication information in the memory unit 130 (S213). That is, the control unit 140 examines the first authentication region 131.

If the first authentication information is not present, the control unit 140 performs a procedure for an initial setting mode (S215). In the initial setting mode, the control unit 140 can register authentication information and register identification information using the authentication information. The procedure is described in detail in connection with FIG. 3.

Figure 3:
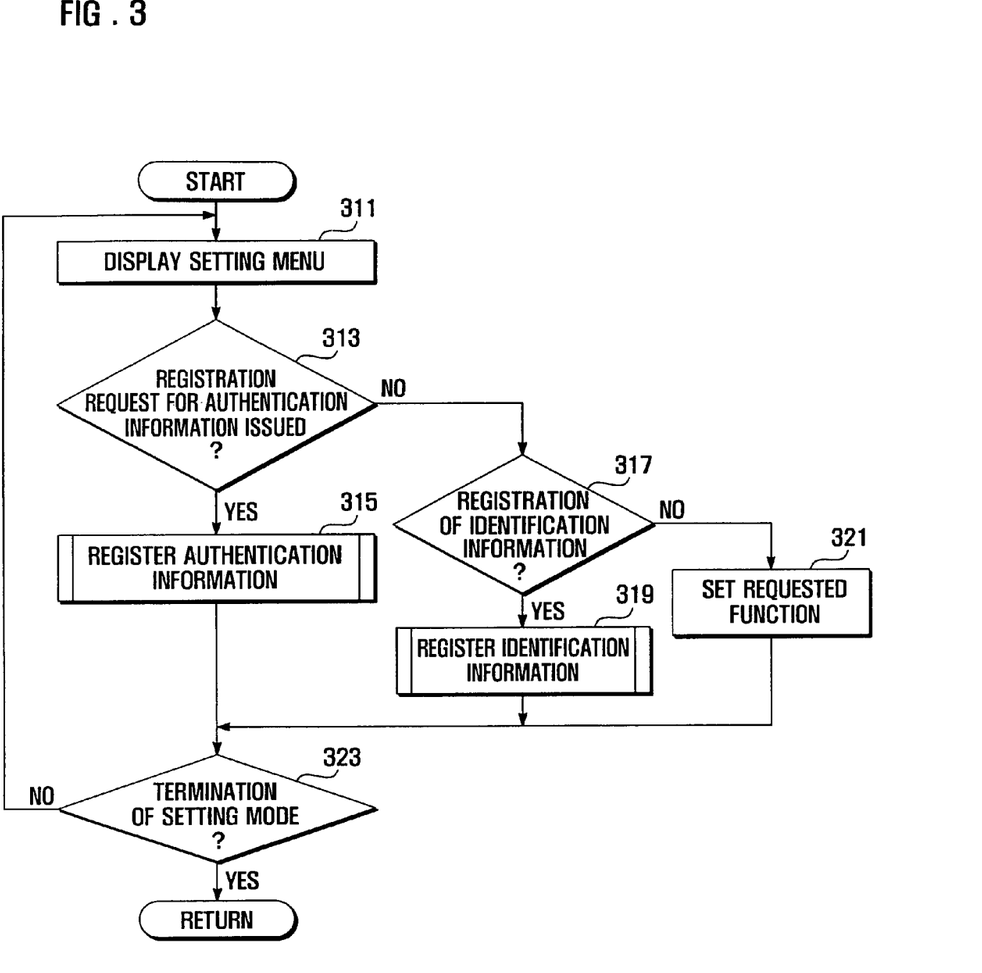
FIG. 3 is a flow chart illustrating a procedure for initial setting in the method of FIG. 2.

FIG. 3 is a flow chart illustrating a procedure for initial setting in the method of FIG. 2.

Referring to FIG. 3, upon transitioning to the initial setting mode, the control unit 140 displays a setting menu (S311). The setting menu includes menu items to set various functions of the mobile terminal 100.

The control unit 140 checks whether a registration request for authentication information is issued through the setting menu (S313). If a registration request for authentication information is issued, the control unit 140 performs registration of authentication information (S315). During registration, the control unit 140 stores the first to third authentication information in the first to third authentication regions 131 to 135 of the memory unit 130. The registration of authentication information is described in detail below.

Figure 4:
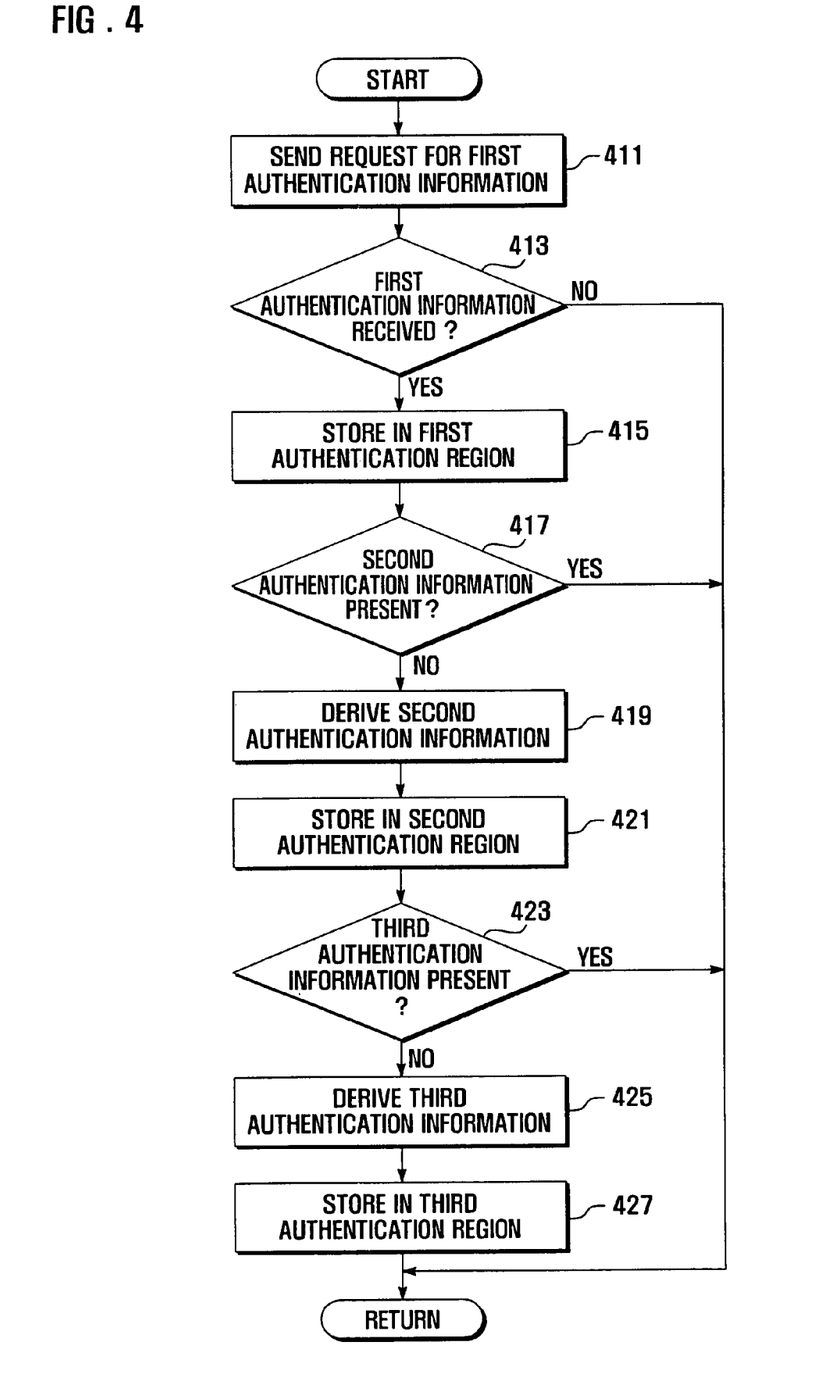
FIG. 4 is a flow chart illustrating a registration procedure for authentication information in the procedure of FIG. 3.

FIG. 4 is a flow chart illustrating a registration procedure for authentication information in the procedure of FIG. 3.

Referring to FIG. 4, the control unit 140 connects to an identification information server (not shown) and sends a request for the first authentication information (S411). When the first authentication information is received from the identification information server (S413), the control unit 140 stores the first authentication information in the first authentication region 131 (S415). The control unit 140 examines the second authentication region 133 of the memory unit 130 to check whether the second authentication information is present (S417).

If the second authentication information is not present, the control unit 140 derives the second authentication information from the first authentication information (S419). At step S419, the control unit 140 may derive the second authentication information by encrypting the first authentication information. For example, the control unit 140 can generate the second authentication information by changing the data length of the first authentication information through hashing. Thereafter, the control unit 140 stores the second authentication information in the second authentication region 133 (S421). The control unit 140 examines the third authentication region 135 of the memory unit 130 to check whether the third authentication information is present (S423).

If the third authentication information is not present, the control unit 140 derives the third authentication information from the first authentication information or the second authentication information (S425). At step S425, the control unit 140 may derive the third authentication information by checksumming the first authentication information or the second authentication information. Thereafter, the control unit 140 stores the third authentication information in the third authentication region 135 (S427), and returns to the procedure of FIG. 3.

If second authentication information is present at step S417, the control unit 140 returns to step S315 of FIG. 3. If third authentication information is present at step S423, the control unit 140 returns to step S315 of FIG. 3.

Referring back to FIG. 3, if a registration request for authentication information is not issued, the control unit 140 checks whether a registration request for identification information is issued (S317). If a registration request for identification information is issued, the control unit 140 performs registration of identification information (S319). During registration, the control unit 140 stores identification information in the identification region 137 of the memory unit 130. The registration of identification information is described in detail below.

Figure 5:
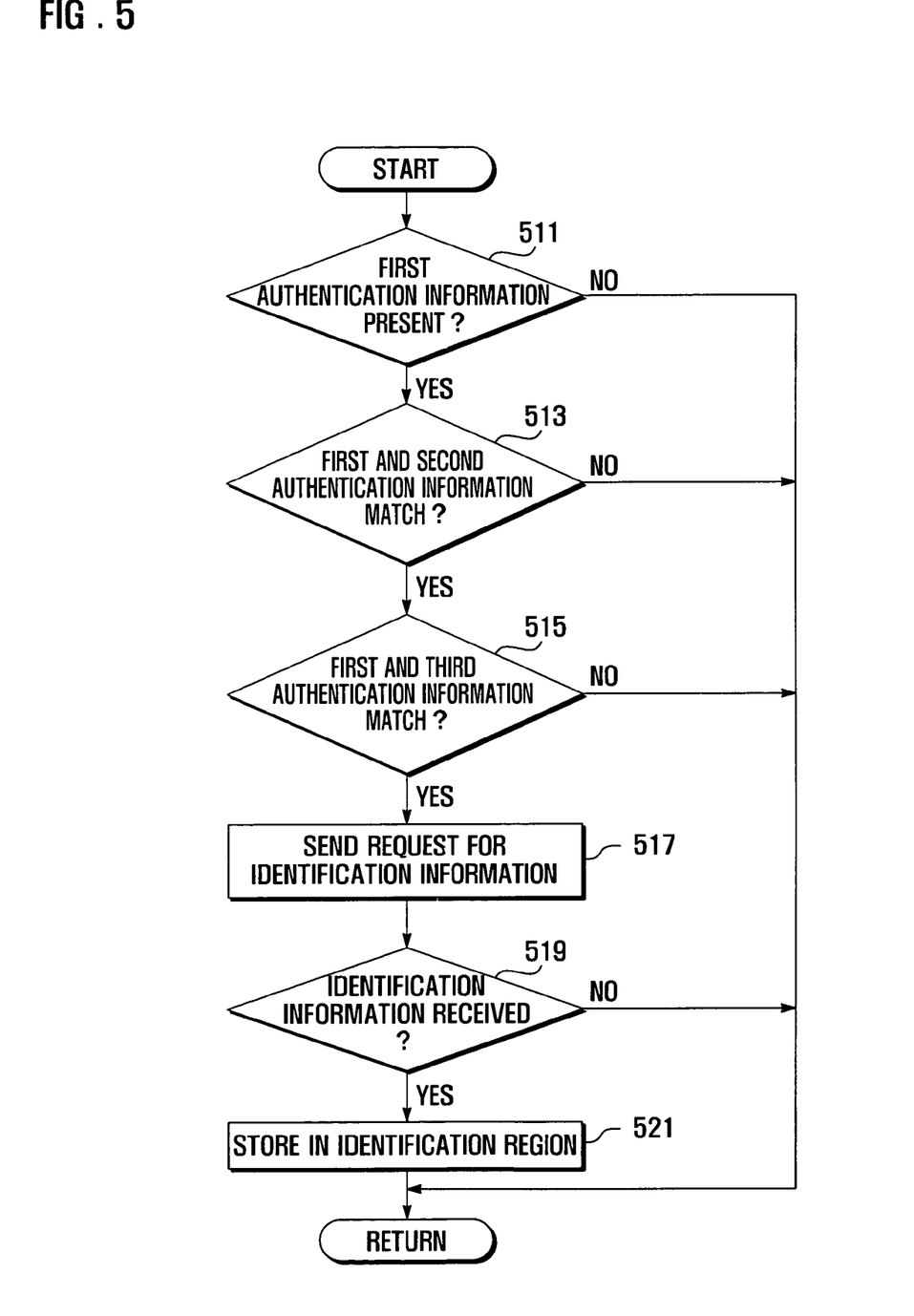
FIG. 5 is a flow chart illustrating a registration procedure for identification information in the procedure of FIG. 3.

FIG. 5 is a flow chart illustrating a registration procedure for identification information in the procedure of FIG. 3.

Referring to FIG. 5, the control unit 140 examines the first authentication region 131 of the memory unit 130 to check whether the first authentication information is present (S511). If the first authentication information is present, the control unit compares the first authentication information to the second authentication information to check whether the first authentication information matches with the second authentication information (S513). At step S513, the first authentication information is encrypted before comparison. If the first authentication information matches with the second authentication information, the control unit compares the first authentication information to the third authentication information to check whether the first authentication information matches with the third authentication information (S515). At step S515, the first authentication information is checksummed before comparison.

If the first authentication information matches with the third authentication information, the control unit 140 connects to the identification information server and sends a request for identification information (S517). At step S517, the control unit connects to the identification information server to identify an authentication code associated with the authentication address of the first authentication information. The control unit 140 compares the identified authentication code to the authentication code of the first authentication information. If the identified authentication code is equal to that of the first authentication information, the control unit 140 sends a request for identification information. Thereafter, when identification information is received from the identification information server (S519), the control unit 140 stores the received identification information in the identification region 137 (S521), and returns to the procedure of FIG. 3. Accordingly, the control unit 140 can register identification information if all of the first to third authentication information match.

On the other hand, the control unit 140 returns to the procedure of FIG. 3, if the first authentication information is determined to be not present at step S511, if the first authentication information is determined to be different from the second authentication information at step 513, or if the first authentication information is determined to be different from the third authentication information at step 515. Accordingly, the control unit 140 cannot register identification information if all of the first to third authentication information do not match.

Referring back to FIG. 3, when a request other than a registration request is issued at step S311 through the setting menu, the control unit 140 sets a requested function (S321).

When a termination request for the initial setting mode is issued (S323), the control unit 140 terminates the initial setting mode and returns to the procedure of FIG. 2. The control unit 140 may repeat steps S311 to S323 until a termination request is issued.

Referring back to FIG. 2, if the first authentication information is determined to be present at step S213, the control unit 140 performs an operation mode procedure (S217). In the operation mode procedure, the control unit 140 performs communication using the identification information stored in the memory unit 130, and may change the identification information. The procedure is described in detail below.

Figure 6:
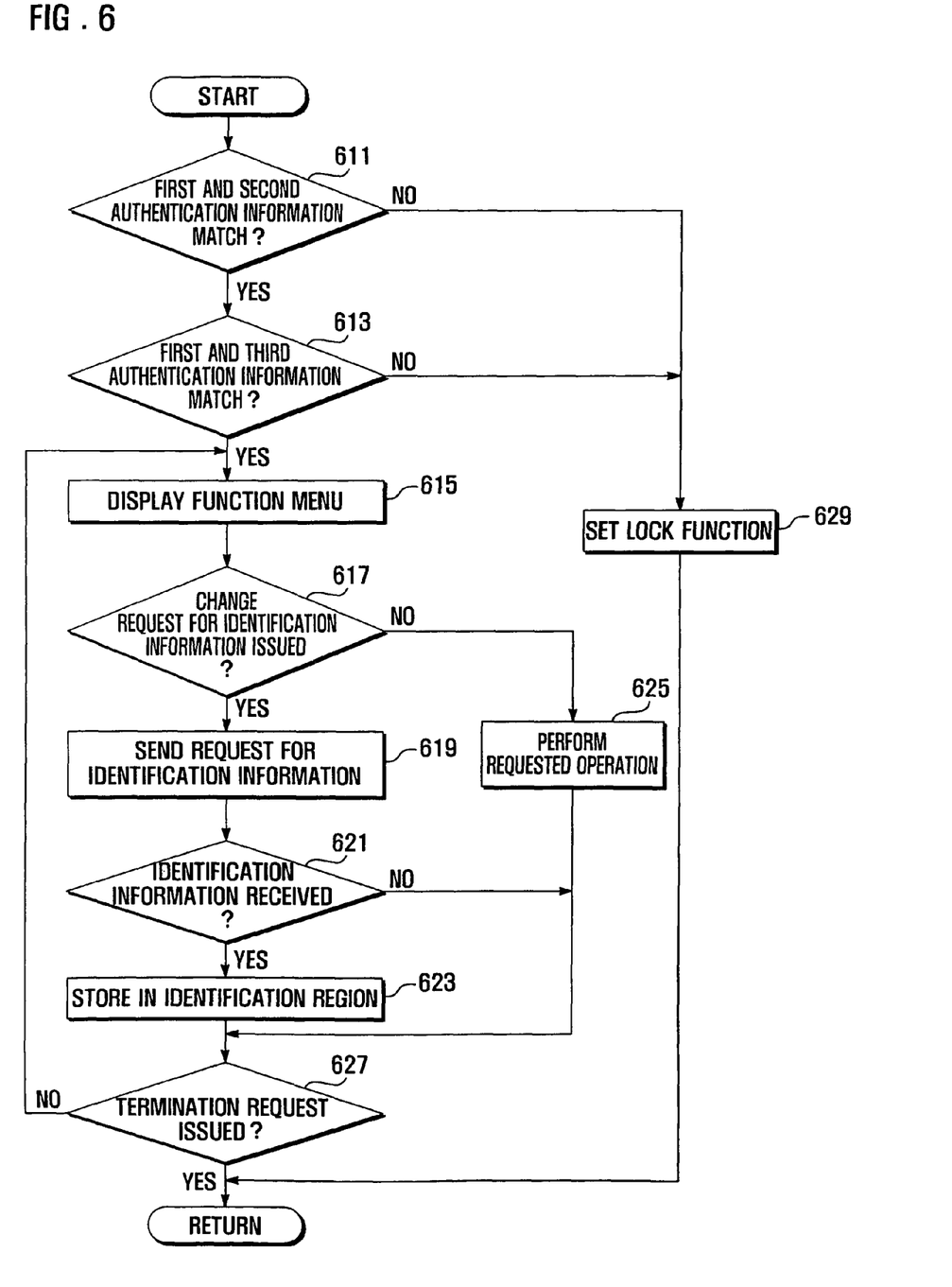
FIG. 6 is a flow chart illustrating an operation mode procedure in the method of FIG. 2.

FIG. 6 is a flow chart illustrating an operation mode procedure in the method of FIG. 2.

Referring to FIG. 6, during the operation mode, the control unit 140 compares the first authentication information to the second authentication information (S611). The first authentication information is encrypted before comparison. If the first authentication information matches with the second authentication information, the control unit 140 compares the first authentication information to the third authentication information (S613). The first authentication information is checksummed before comparison. If the first authentication information matches with the third authentication information, the control unit 140 displays a function menu (S615). The function menu includes menu items associated with various functions of the mobile terminal 100.

When a change request for identification information is issued through the function menu (S617), the control unit 140 connects to the identification information server and sends a request for identification information (S619). That is, the control unit 140 connects to the identification information server and identifies an authentication code associated with the authentication address of the first authentication information. The control unit 140 compares the identified authentication code to the authentication code of the first authentication information. If the identified authentication code is equal to that of the first authentication information, the control unit 140 sends a request for identification information. Thereafter, when the identification information is received from the identification information server (S621), the control unit 140 stores the received identification information in the identification region 137 (S623). Accordingly, the control unit 140 can change the identification information if all of the first to third authentication information match.

When a request other than the change request for identification information is issued through the function menu, the control unit 140 performs a requested operation (S625).

When a termination request for the operation mode is issued (S627), the control unit 140 terminates the operation mode and returns to the procedure of FIG. 2. The control unit 140 may repeat steps S615 to S627 until a termination request is issued.

On the other hand, the control unit 140 sets the lock function of the mobile terminal 100 (S629) and returns to the procedure of FIG. 2, if the first authentication information and second authentication information are determined to be different to each other at step S611, or if the first authentication information and third authentication information are determined to be different to each other at step S613. Accordingly, if all of the first to third authentication information do not match, the control unit 140 cannot change the registered identification information and cannot perform a function provided by the mobile terminal 100.

In the previous description, at step S425, the control unit 140 derived the third authentication information from the first authentication information through checksumming. However, the present invention is not limited thereto. For example, the control unit 140 may derive the third authentication information from the second authentication information through checksumming. Then, at step S515 or step S613, the control unit 140 can check whether the second authentication information matches with the third authentication information with respect to checksumming.

Further, the mobile terminal 100 has three authentication regions in the memory unit 130. However, the present invention is not limited thereto. The present invention may be realized through a mobile terminal having at least two authentication regions in the memory unit to store at least two pieces of authentication information.

As apparent from the above description, at least two pieces of authentication information are registered in a mobile terminal. Identification information can be registered or updated only when all of the pieces of authentication information match. Thus, even when the mobile terminal is stolen, new identification information is not readily registered in the mobile terminal and existing identification information is not readily changed. Further, upon power on, the mobile terminal compares the pieces of authentication information to each other, and activates a lock function if they do not match. Accordingly, upon theft or loss of the mobile terminal, illegal use thereof is prevented. Thereby, the present invention contributes to solving the problem of lost or stolen mobile terminals.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A protection method for a mobile terminal, comprising:
   receiving, when the mobile terminal is in an initial setting mode, a piece of authentication information from a server;
   generating another piece of authentication information from the received piece of authentication information;
   registering the received piece of authentication information in a region of a memory of the mobile terminal and the generated piece of authentication information in another region of the memory of the mobile terminal;
   registering an identification information by receiving the identification information from the server using one of the registered pieces of authentication information;
   comparing, upon powering on of the mobile terminal, the pieces of authentication information to each other; and
   performing, when the pieces of authentication information match, a communication operation using the identification information, and setting, when the pieces of authentication information do not match, a lock function.

2. The protection method of claim 1, wherein registering identification information comprises:
   comparing, in response to a registration request for identification information, the registered pieces of authentication information to each other;
   sending, when the registered pieces of authentication information match, a request for identification information using one of the registered, pieces of authentication information; and
   storing, upon reception of identification information, the received identification information.

3. The protection method of claim 1, wherein generating another piece of authentication information comprises:
   deriving another piece of authentication information from the received piece through encryption.

4. The protection method of claim 3, wherein generating another piece of authentication information further comprises deriving another piece of authentication information from the encrypted piece of authentication information through checksumming.

5. The protection method of claim 1, wherein performing a communication operation comprises changing the registered identification information using one of the registered pieces of authentication information.

6. The protection method of claim 1, wherein deriving another piece of authentication information is performed when no piece of authentication information is present in another region of the memory of the mobile terminal.

7. The protection method of claim 1, wherein generating another piece of authentication information comprises deriving another piece of authentication information from the received piece of authentication information through checksumming.

8. The protection method of claim 1, wherein at least one of the received piece of authentication information and the generated piece of authentication information is a master subsidy lock(MSL) code and a MSL address.

9. A mobile terminal comprising:
- a wireless communication unit configured to communicate with a server when the mobile terminal is in an initial setting mode;
- a control unit configured to control the wireless communication unit to receive a piece of authentication information from the server, generate another piece of authentication information from the received piece of authentication information, and control the wireless communication unit to receive an identification information from the server using one of the received piece of authentication information and the generated piece of authentication information;
- a memory unit configured to have at least two authentication regions to register the received piece of authentication information and the generated piece of authentication information, and register the received identification information; and
- a comparator configured to compare, upon powering on of the mobile terminal, the registered pieces of authentication information to each other,
- wherein the control unit controls an operation to perform communication using the registered identification information when the registered pieces of authentication information match, and sets a lock function when the registered pieces of authentication information do not match.

10. The mobile terminal of claim 9, wherein the control unit controls, in response to a registration request for identification information, an operation to compare the registered pieces of authentication information to each other, send, when the registered pieces of authentication information match, a request for identification information using one of the registered pieces of authentication information, and to register, upon reception of identification information, the received identification information.

11. The mobile terminal of claim 9, wherein the control unit controls, during communication, an operation to change the registered identification information using one of the registered pieces of authentication information.

12. The mobile terminal of claim 9, wherein the control unit derives, when another piece of authentication information is not present, another piece of authentication information from the received piece of authentication information through encryption.

13. The mobile terminal of claim 12, wherein the control unit derives, when another piece of authentication information is not present, another piece of authentication information from the encrypted piece of authentication information through checksumming.

14. The mobile terminal of claim 9, wherein the control unit derives, when another piece of authentication information is not present, another piece of authentication information from the received piece of authentication information through checksumming.

15. The mobile terminal of claim 9, wherein at least one of the received piece of authentication information and the generated piece of authentication information is a master subsidy lock(MSL) code and a MSL address.

* * * * *